June 16, 1942. J. McELGIN 2,286,749
AIR CONDITIONING APPARATUS
Filed May 1, 1939 2 Sheets-Sheet 1
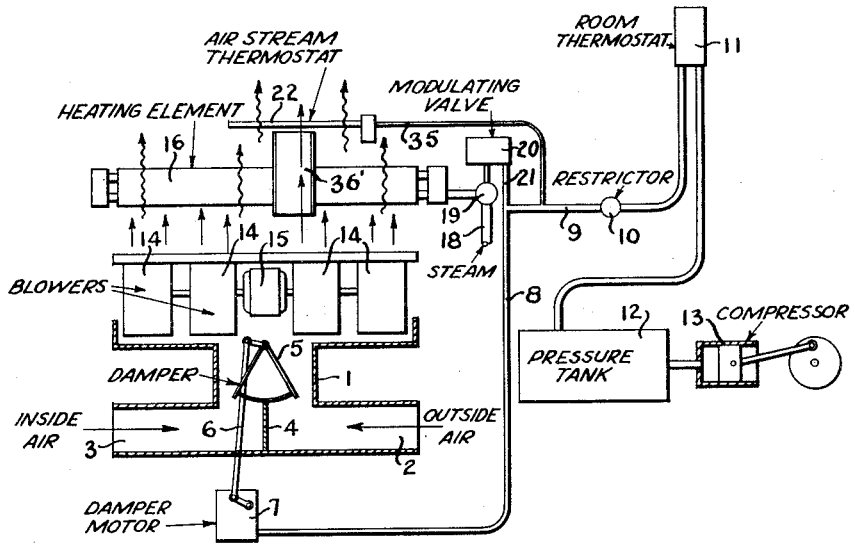
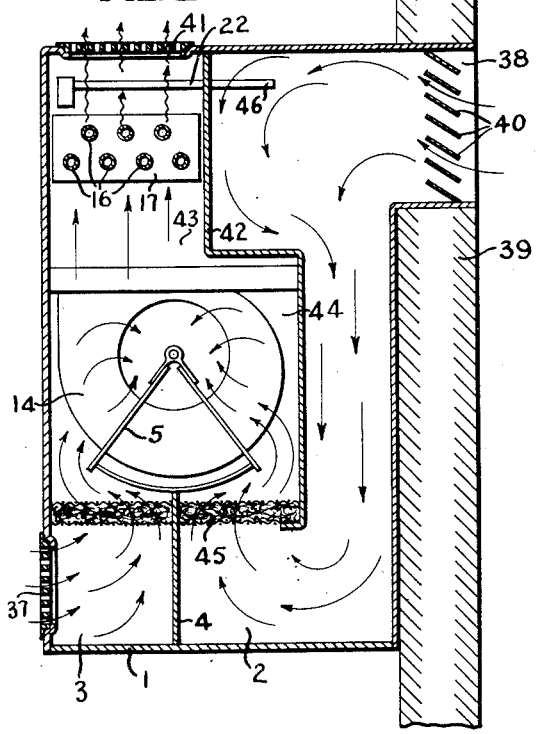
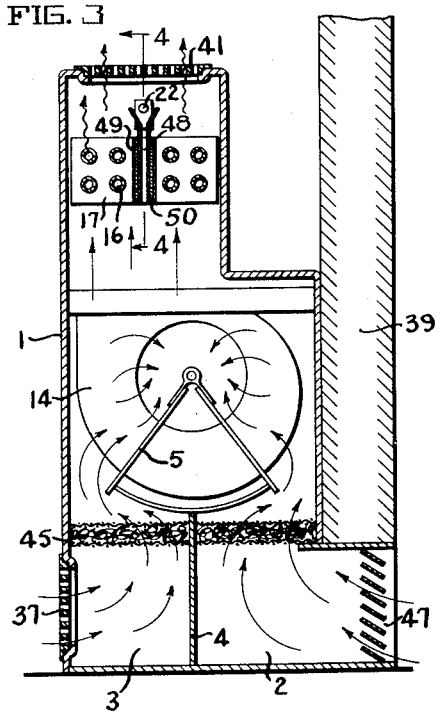
INVENTOR
JOHN McELGIN
BY Toulmin & Toulmin
ATTORNEYS

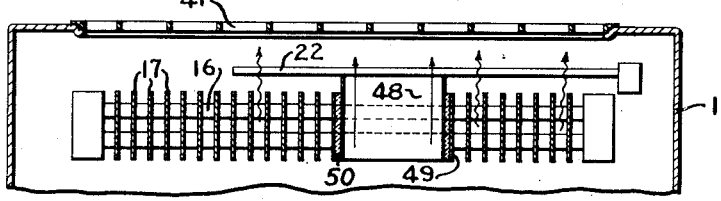
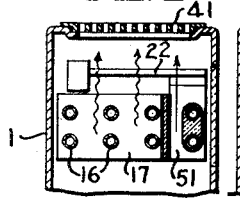
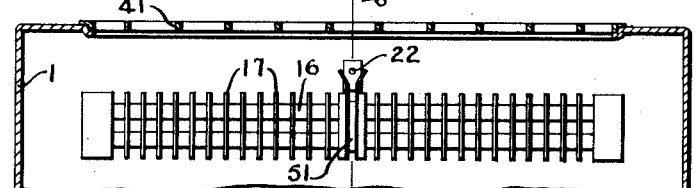
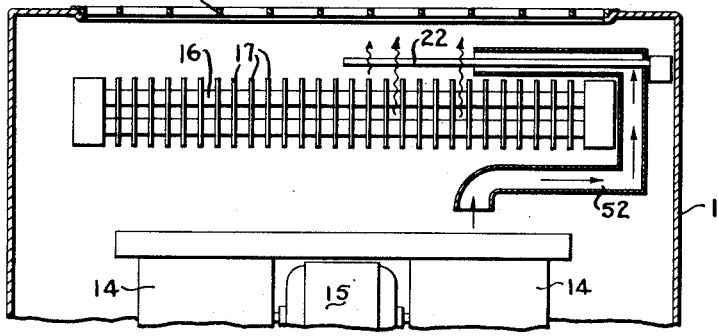
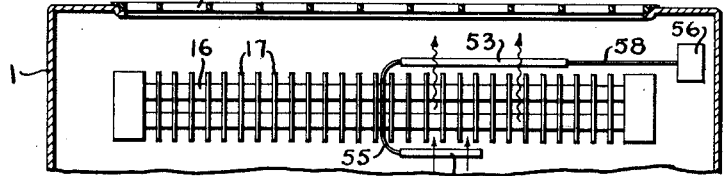
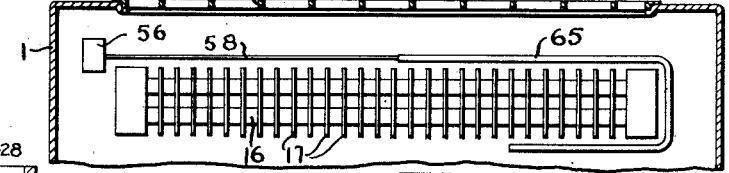
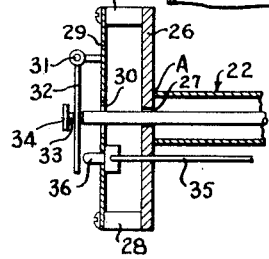
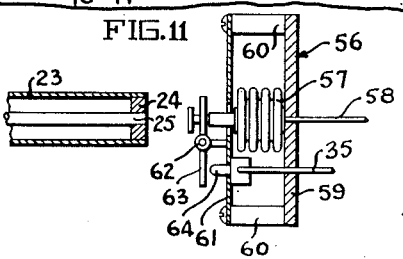
INVENTOR
JOHN McELGIN
BY Toulmin & Toulmin
ATTORNEYS Patented June 16, 1942

2,286,749

UNITED STATES PATENT OFFICE 2,286,749

AIR CONDITIONING APPARATUS

John McElgin, Philadelphia, Pa., assignor to John J. Nesbitt, Inc., Philadelphia, Pa., a corporation of Pennsylvania Application May 1, 1939, Serial No. 270,984

12 Claims. (Cl. 236—38)

The present invention relates to a control means for ventilating and/or conditioning units.

In my application Serial No. 144,216 filed May 22, 1937, and which has matured into Patent No. 2,216,350, granted October 1, 1940, there is disclosed a control system for unit ventilators which effectively prevents drafts. It was pointed out in said application that, in order to prevent drafts, it is desirable to place a thermostat in the air stream coming from or traversing the casing containing the heat exchanger. In mild winter weather, a proper cooling effect could be obtained by introducing outside air at approximately 10 degrees less than the inside air, without causing cold drafts. As the weather gets colder, however, and the outside temperature decreases, a lesser need arises for the introduction of outside air for the sake of this cooling power, even though the room thermostat may occasionally demand it. Furthermore, if the cooling rate is too rapid, drafts may occur and cause complaints.

In order to overcome the annoying and detrimental effects of these drafts, there was provided, in accordance with the said invention, a readjustable thermostat arranged in the air stream traversing the heat exchanger casing. This thermostat was subjected to the control of an outside thermostat which automatically readjusts the control or operating point of the thermostat in an upward direction so that it operates at a higher inside temperature as the outside temperature falls. Aside from the reduced cooling effect thereby obtained, this also gives the additional advantage of the offsetting of the drooping effect of the air stream control necessitated to prevent hunting. The readjustable air stream thermostat was controlled by varying the air pressure in the fluid pressure control circuit in accordance with the outside temperature.

While a fluid pressure control circuit of this character operates satisfactorily, the control is exercised in an indirect manner. However, in accordance with the present invention, I have made a discovery which permits the operating point of the thermostat to be controlled directly by the outside temperature. Thus, it is not necessary to effect the control through the fluid pressure circuit and, to that extent, the changes in the outside temperature are reflected more accurately in the changes of the operating point of the thermostat.

The primary object of the present invention is to provide improved control means for ventilating and/or air conditioning units.

A more particular object is to provide a single air stream temperature control means for such units, together with improved means for automatically readjusting the control point of the thermostat upwardly, as the outside temperature is reduced.

Another object is to provide apparatus and a method for controlling and readjusting the control points of the air stream control thermostats of a plurality of air conditioning units by subjecting the thermostats directly to both the indoor and outdoor temperatures or at least to a combined indoor temperature and a temperature which changes in accordance with outdoor temperature.

A still further object is to provide a ventilating system in which the proportion of outdoor and indoor air is controlled more directly by the outdoor and indoor temperatures than in the prior art systems, thus simplifying the apparatus as well as assuring additional positiveness of control.

A final object is to provide a ventilating system employing a thermostat for operating a damper together with a simplified structure by which the thermostat regulates the indoor temperature with respect to the outside temperature in such a manner as to prevent drafts when the outside temperature decreases.

These objects are attained in brief by mounting a thermostat, not only in the air stream produced at the radiator, but also in such a position as to be directly affected by the indoor and outdoor temperatures. Thus, as the outdoor temperature decreases, the effect of this decrease in temperature controls or modifies the effects on the thermostat brought about by the indoor temperature.

Other objects and features will be apparent as the specification is perused in connection with the accompanying drawings, in which—

Figure 1 is a diagrammatic view of a system which employs a thermostat improved in accordance with the present invention for regulating the proper proportion of outdoor and indoor air. The system shows an improved structure by which the control point of the thermostat is regulated in accordance with changes in the temperature of the outdoor air.

Figure 2 shows an improved automatic ventilating system, in which the thermostat is subjected directly to the composite effect of indoor and outdoor air, also to the outdoor air, per se.

Figure 3 illustrates a structure in which the thermostat is exposed to indoor air and a mixture of recirculated and outdoor air. In this figure, the air mixture is brought through a channel or passageway formed in the center of the radiator.

Figure 4 is a fragmentary longitudinal view in section, taken along line 4—4 in Figure 3, and showing the central position of the passageway referred to hereinbefore.

Figure 5 shows a structure similar to Figures 3 and 4, but with the air channel or passageway formed at the center of the radiator in one plane and to the side of the radiator in the other plane, as shown in Figure 6.

Figure 6 is a section taken along line 6—6 in Figure 5.

Figure 7 illustrates still another modified structure, in which the mixture of outdoor and recirculated air is presented directly to the thermostat.

Figure 8 shows a system employing a thermostat which does not depend on the expansion of metal, as in the previous figures, but instead on the expansion of a volatile liquid.

Figure 9 shows a position of the volatile thermostat, different from that shown in Figure 8.

Figure 10 is a longitudinal view, partly in section, of a typical thermostat which may be employed in any of the foregoing arrangements or systems.

Figure 11 is similarly a longitudinal view, partly in section, but showing the actuating portion of a thermostat which operates in connection with a volatile liquid expansion tube.

Referring to the drawings in detail, and with reference particularly to Figure 1, the casing 1 of the air conditioning unit is provided with an outside air inlet opening 2 and an inside or a recirculated air inlet opening 3. These openings are separated by a wall or partition 4, and the sizes of the openings are controlled by means of a damper 5 which is actuated preferably through a link system 6 by a damper motor or engine 7 of any suitable and well-known type. The latter obtains its energy from the variations in pressure of a fluid, preferably air, which passes through the pipe 8.

The pipe 8 connects through a branch line 9, a restrictor valve 10, room thermostat 11 with a tank 12. The latter is filled with air under pressure from a crank operated compressor 13. The pipe line just traced constitutes part of a fluid pressure system for controlling the heating and ventilating effects within the air conditioning unit.

As the fluid pressure in the pipe 8 varies for reasons which will be explained hereinafter, the motor 7 swings the damper 5 about its pivot to change the relative proportion between the inside or recirculated air and the outside air being admitted to the casing.

In addition to the damper, the casing may contain entirely or in part a blower system consisting of four centrifugal units 14 actuated by a common electrical motor 15. Thus, the mixture of inside and outside air, as determined by the position of the damper 5, is admitted to the eye of each blower and expelled or discharged through a suitably positioned peripheral passageway. As is well known, blowers of this type, as illustrated in Figures 2 and 3, include a volute chamber which changes the axial direction of the air entering the eye of the blower into a tangential direction as the air leaves the discharge opening.

A source of heat 16 which may take the form of a steam radiator provided with transversely extending fins 17 is provided in the path of the air leaving the blower system. The arrangement is such that the air from the blowers passes between the walls of the radiator including spaces between the fins and leaves the radiator in a heated condition. The radiator is provided with steam through a pipe 18 which contains an adjusting valve 19. The adjustment of the valve 19 is controlled by a so-called "modulating" valve 20 which is connected to the fluid system by means of the pipe 21 and is, therefore, responsive to the pressure of the fluid system.

In order to regulate the pressure of the fluid system and thereby control both the valve 19 and the damper 5, there is provided an air stream thermostat indicated at 22 which is disposed in the path of the air which is being driven through the radiator. While a number of forms of thermostat may be used for this purpose, I prefer the differential expansion type shown in detail in Figure 10.

As illustrated, the thermostat depends for its operation on the difference in heat expansion of two different metals and this difference of expansion is translated into a change of pressure in the fluid system by permitting different amounts of fluid to escape from the system, depending on the intensity of heat to which the thermostat is exposed. One of these metals may comprise a sleeve 23 of brass which is rigidly secured at one end by a disk 24 to a centrally disposed rod 25 of Invar or any other suitable metal composition which has a different rate of heat expansion than brass. The brass cylinder 23 is rigidly secured at the end opposite from the disk 24 to a metal disk 26 which contains an opening 27 sufficiently large loosely to receive the rod 25. The disk 26 carries a plurality of spacers 28 to which are secured a metal plate 29. The latter also has a fairly large central opening 30, through which the rod 25 projects. A pivot member 31 is secured to the plate 29, this member carrying a bar 32. There is an opening (not shown) in the bar 32, which receives the shank portion 33 of a thumb screw 34 which is threaded into the end of the rod 25.

A pipe 35 projects transversely through the disk 26 and terminates in a leakstat or nozzle 36. The latter has an opening (not shown), through which fluid which is contained in the pipe 35 can be emitted. The pipe is connected to the fluid system at the branch line 9, as indicated in Figure 1.

It is apparent that, as the sleeve 23 is cooled by a lowering of the temperature of the air passing through the radiator 16 (Figure 1), the point A (Figure 10) moves to the right with respect to a point directly below on the rod 25. This is due to the contraction of the sleeve without a corresponding contraction on the part of the rod 25. As the sleeve moves to the right, it carries with it in the same direction the disk 26 and the plate 29 which, in turn, moves the pivot point 31 also to the right. The movement of the latter will cause the arm 32 to fulcrum about the left-hand end of the rod 25, causing the lower end of the bar 32 to move away from the nozzle 36. The greater the contraction of the sleeve 23, the further away will be the lower end of the bar 32 from the lefthand end of the nozzle 36. It is apparent that an increased heating of the sleeve 23 will have the reverse effect and will cause the lower end of the bar 32 to move closer to the nozzle 36.

Assuming that the opening in the nozzle 36 has been uncovered by the removal of the bar 32 upon a contraction of the sleeve 23, air or other fluid is permitted to escape from the pipe 35 which has the effect of reducing the air pressure not only in that pipe, but also throughout the entire fluid system including the pipes 8, 9 and 21. A reduction in the pressure of this system may be sufficient to cause the modulating valve 20 to open the steam valve 19 to supply the radiator 16 with steam.

In addition, the reduced aforementioned pressure will cause the damper motor 7 to swing the damper 5 to the right (Figure 1) and reduce the amount of outside air being admitted, depending on the amount demanded by the thermostat and in like proportion increasing the amount of air which is obtained from the heated room and recirculated through the unit. Thus, the thermostat 22, by controlling the amount of air which is permitted to escape at the leakstat 36, varies the pressure in the fluid system which, in turn, makes the necessary adjustments in the amount of heat supplied to the radiator and the proportions of the inside and outside air admitted to the casing to maintain a relatively constant temperature at the position of the thermostat.

The room hermostat 11 also serves to control the pressure in the fluid system in accordance with the temperature in the room remote from the radiator. A pneumatic thermostat of this character is well known in the art and needs no further explanation.

In order to prevent the possibility of hunting due to frequent changes in the inside or outside temperature, it is customary to provide the thermostat with a wide differential. In other words, the controlling effects are not exercised unless the changes in temperature become quite material. However, by providing an air stream control which has a wide differential expansion effect, an undesirable drooping effect might be introduced in the temperature characteristics and this gives rise, at least in part, to drafts and other inconveniences from the comfort standpoint.

In accordance with my prior invention, there is provided an automatic arrangement by which the control point of the thermostat is changed in response to a change of outdoor temperature so that neither a wide differential of adjustment is necessary at the thermostat, nor is any hunting effect introduced. This automatic adjustment is brought about by means of a bellows contained within the thermostat and serving to move the air nozzle or leakstat with respect to the pivoted arm in accordance with changes of outdoor temperature. An arrangement of this character operates satisfactorily, but in accordance with the present invention, I have found that the adjustment bellows is not necessary and that the control point of the thermostat can be changed by directly exposing a portion of the thermostat to the outdoor air or at least to an unheated mixture of outdoor and indoor air. To this extent, the present improvement offers a somewhat more simplified structure than that shown in my prior application.

The improvement is shown diagrammatically in Figure 1, in which a conduit or channel 36' is provided through the radiator 16 for presenting air directly from the blowers 14 to a portion of the thermostat 22. Thus, the thermostat is subjected to air which has passed through the radiator and thereby heated, also to air discharged at the blowers and which represents a mixture of the inside and outside air which has flowed past the damper 5.

It is apparent that the temperature of the air discharge at the blowers is dependent upon the temperature of the outside air, since the latter constitutes part thereof and that the thermostat is in effect exposed to heated air and also to outside air, depending on the position of the damper 5. The heated air tends to cause the brass member 23 (Fig. 10) to expand and thus to move the arm 32 about its pivot toward the nozzle 36. The fluid pressure in the line is, therefore, increased, assuming a constant pressure in the tank 12. But the outside air or the mixture of the inside and outside air tends to cool that portion of the brass sleeve in the vicinity of the conduit 36' and this cooling effect causes the sleeve to contract.

As stated hereinbefore, a contraction of the sleeve moves the arm 31 away from the nozzle 36 and tends to reduce the fluid pressure in the control system by permitting fluid to escape at that point. Therefore, the actual movement of the arm 32 in regulating the fluid pressure in the control system is determined by the differential expansion effects of the heated air on the one hand and the cool air mixture on the other hand. The colder the outside air becomes, the gr ater is the cooling or compensation effect introduced at the thermostat and the greater will be the change in the control point of the latter.

It can readily be seen that to offset the effect of the colder air striking a portion of the thermostat, the remaining portion must be heated to a greater degree. The rate at which the control point is thus changed is obviously dependent not only on the temperature of the outside air or on the degree of mixture of this outside air with the inside air, but also on the amount of air which is passed through the conduit 36' and strikes the thermostat. The relative lengths of the thermostat which are exposed to these various types of air also assist in the determination of the control point. These factors are adjusted to provide an increase in the control point of the thermostat as the temperature of the outside air decreases. The range over which the thermostat is adjusted will usually fall between 60° and 75°. Thus, in mild weather, a 60° low limit may prevail, while in weather of 20° or below, a 75° low limit might be used. Consequently, in very cold weather, for example, 20° or below, the compensatory effect on the thermostat produced by the outdoor air would cause the thermostat to operate the steam valve and the damper at the 75° low limit instead of the 60° limit. This advanced adjustment of the thermostat prevents the room temperature from becoming less than 75° during cold weather and, therefore, precludes drafts.

Figure 2 shows one practical way in which the improvement may be carried out. The casing 1 may take the general form of a rectangular metal box having a recirculated air inlet 37 near the bottom of the box and an outdoor air inlet 38 at the top of the box. As shown, the casing may be fitted into an opening in the wall 39 of a building at a window casement. The opening 38 is preferably provided with inclined louvres 40, and the opening 37 is shown as being provided with a grill. The box is provided at the end opposite from the opening 37 with a grill opening indicated at 41 for the egress of the mixed air. Within the casing 1, there is a partition 42 which, together with the opening 41, forms a closed compartment 43. The partition at the other end forms a compartment 44 which is open at the lower end and contains a filter 45 of any suitable and well-known design. This compartment contains a damper 5 pivoted at 10 and is adapted to swing right and left in response to the actuation of a damper motor 7, as was explained in connection with Figure 1. The damper, in moving to the left, tends to close the opening between the partition 4 and the left side of the casing 1; and, in moving to the right, closes the opening between the partitions 4 and 42.

Within the compartment 43, there is a radiator indicated by the steam pipes 16 on which are mounted a number of transversely extending fins 17. The radiator is caused to be heated by steam flowing through a pipe 18 (Fig. 1), as is explained hereinbefore.

In order to control the amount of steam fed to the radiator 16 and to control the operation of the damper 5, there is provided a differential expansion thermostat 22 which is positioned between the radiator and the opening 41. As will be noted, a portion 46 of the thermostat 22 projects through the partition 42 and is exposed directly to the cool air admitted through the opening 38.

As in the case of Figure 1, the heated air from the radiator 16 causes the sleeve of the thermostat 22 to expand and compensatory effects are introduced at the thermostat by the cooling effect of the air introduced through the opening 38 and striking the projecting portion of the thermostat. This cool air passes downwardly as shown between the casing 42 and the wall 39 and, together with the recirculated air passing through the inlet 37, is drawn into the eye of the fan 14. The mixed air thereupon passes upwardly through the radiator where it is heated and thence out through the discharge openings 41.

As in the case of Figure 1, the cooling effects introduced at the projecting portion 46 of the thermostat serves to increase the operating point of the latter. Thus, the control point of the thermostat becomes self-compensating for changes in outside temperature.

Instead of exposing a portion of the thermostat to the outside air, I may subject a part of the thermostat sleeve to the mixed air before it has been heated. An arrangement of this character is shown in Figure 3 and this structure is particularly adapted to a unit, in which the outdoor air inlet is positioned near the bottom of the wall of the building. The operation of the structure shown in this figure is similar to that described in connection with Figure 2, except that the outdoor air is taken through an opening 47 at the bottom of the wall 39. This air passes through the filter 45 into the eye of a fan 14 where it is mixed with the indoor or recirculated air which passes through the opening 37 and which also flows through the filter 45 into the fan. The mixed air then passes in part through the coils 16 of the radiator and, in part, through a passageway or channel 48 provided in the radiator which is shown more clearly in Figure 4. On the drawings, the path of the heated air is indicated by the wiggly or curved arrow lines, and the path of the unheated air mixture is indicated by the straight arrow lines. The channel may be formed within a rectangular box structure 49 of elongated configuration and which is heat insulated, as indicated at 50 from the radiator.

The thermostat 22 is affected by the heated air mixture which passes through the radiator and also by the unheated air mixture which passes through the channel 48. The temperature of the latter depends on the temperature of the outdoor air, since it is substantially unheated, except for the slight heat effects of the recirculated air. Thus, the control point of the thermostat is again changed in accordance with the temperature of the outdoor air, and as in the case of the two previous figures, this control point is made higher as the temperature of the outdoor air becomes reduced.

In Figures 5 and 6, I have shown still another way in which the unheated mixed air can be passed through the radiator to affect the control point of the thermostat in accordance with the temperature of the outdoor air. As will be noted, the unheated air mixture is passed through the radiator in an unheated condition by means of a heat insulated channel 51 formed at one side of the radiator, as indicated in Figure 6 and positioned approximately in the middle of the radiator in the other plane, as indicated in Figure 5.

Figure 7 shows a scheme by which the mixed air delivered by the blowers 14 is directed around the radiator through a conduit 52 in order to cool a portion of the thermostat.

In Figure 8, a form of thermostat is employed, different from the previous figures. In this figure, I have shown a volatile liquid thermostat formed in two sections 53 and 54 connected together by the tubing 55 and also connected to the actuating portion 56 of the thermostat. The latter portion is shown in Figure 11. The tubes 53 and 54 are filled with a low boiling point liquid or other fluid which expands rapidly upon being heated. The portion 53 is heated by the heated air passing through the radiator, as indicated by the wiggly arrows, while the portion 54 remains unheated or may be actually cooled by the air which is delivered from the blowers and has not passed through the radiator.

It is apparent that, since the temperatures of the heated and unheated air affect the volatile liquid in the tube in a different manner, the pressure of the fluid within the tubing will represent the differential effects of the two air temperatures. The pressure variations are transmitted to a bellows 57 through a pipe 58. The bellows is carried on a disk 59, from which is supported by the spacers 60 a disk 61. A pivot member 62 is secured to the disk 61 and a lever or bar 63 is adapted to rotate about the pivot thereof, also a leakstat or nozzle 64 secured to the disk 61 and the end of which is represented to the bar 63. The leakstat forms a terminus 35 of a fluid pressure control system, as was described in connection with Figure 10.

Consequently, as the pressure of the fluid within the bellows 57 increases upon increase of temperature, the bar 63 is moved about the pivot 62 and toward the leakstat 64. Thus any leakage of the fluid in the pressure control system is reduced, as was explained in connection with an expansion of the sleeve 23 under the same conditions in Figure 10. On the other hand, as the temperature is reduced, the bellows 57 contracts, swinging the bar 63 away from the leakstat, uncovering the opening therein and permitting fluid to leak at this point. Thus, the pressure within the fluid control system is reduced.

As was explained in connection with the foregoing figures, the change in pressure in the fluid control circuit serves to actuate the modulating valve 20 and, therefore, the steam valve 19, and in addition serves to actuate the damper motor 7 and the damper 5 (Figure 1). It is also apparent that, inasmuch as the air which affects the tube 54 represents, in part, the outdoor air passed through the blowers, the temperature of the mixture is proportional to the temperature of the outdoor air. Consequently, the differential expansion effects introduced by the thermostat portion 54 serves to change the control point of the thermostat as a whole, as was explained in connection with the previous figures.

Instead of constructing the thermostat in two portions 53, 54 connected together by a piece of tubing that runs through the radiator, I may use a single unit thermostat of the volatile liquid type in which a portion of the thermostat is exposed to the unheated mixed air and the other portion is exposed to the heated mixed air. Thus, in Figure 9, the thermostat 55 is positioned partly on one side of the radiator, where it will receive heated air and partly on the opposite side of the radiator where it will receive unheated air. The lower temperature effects on the portion of the thermostat which is exposed to the unheated air tends to offset the higher temperature heating effects on the remainder of the thermostat in response to lower outdoor temperatures and thus again the control point of the thermostat is changed in accordance with the outdoor temperature. It is apparent that the system shown in Figure 9 employs an actuating member or a similar device for controlling the amount of leakage at the leak port 14 in accordance with changes of outdoor temperature.

It will be understood that I desire to comprehend within my invention such modifications as come within the scope of the claims and the invention.

Having thus fully described my invention, what I claim as new and desire to secure by Letters Patent is:

1. An air conditioning unit comprising a source of heat and a damper which admits predetermined quantities of outdoor and recirculated air to said unit, a common means for controlling said heat source and damper, said means including a single thermostat having a portion exposed to said heat source and another portion exposed to an unheated mixture of said outdoor and recirculated air.

2. An air conditioning unit comprising a source of heat and a damper which admits predetermined quantities of outdoor and recirculated air to said unit, a common means including a pressure fluid system for controlling said heat source and damper, said means comprising a single differential expansion thermostat having a portion exposed to said heat source and another portion exposed to the temperature of an unheated mixture of said outdoor and recirculated air to vary the pressure of said fluid system, whereby the relative quantities of outdoor and recirculated air are controlled.

3. An air conditioning unit comprising a source of heat and a damper which admits predetermined quantities of outdoor and recirculated air to said unit, a common means for controlling said heat source and damper, said means including a pair of metal members having different coefficients of heat expansion and contraction, said members being exposed respectively to said heat source and to an unheated mixture of said outdoor and recirculated air.

4. An air conditioning unit comprising a casing containing a source of heat and a damper for admitting predetermined portions of room and outdoor air into said casing, means including a single thermostat for controlling said damper, portions of said thermostat being positioned on both sides of said source of heat, and one of said thermostat portions being exposed directly to said heat source, and another thermostat portion being responsive to the temperature of a mixture of indoor and outdoor air.

5. A room air conditioning unit comprising a casing containing a source of heat and a damper for mixing predetermined proportions of room air and outdoor air within said casing, a thermostat mounted in the region of the air leaving the source of heat for controlling said damper, a heat-insulated conduit through said source of heat for said room and outdoor air mixture, said thermostat being subjected to heat from said source and also to said mixture of room and outdoor air flowing through said conduit.

6. A room air conditioning unit comprising a casing containing a radiator and a damper for mixing predetermined portions of room air and outdoor air within said casing, a thermostat mounted in the region of the air leaving the source of heat for controlling said radiator and said damper, a heat-insulated conduit through said radiator for said room and outdoor air mixture, said thermostat being subjected to heat from said radiator and also to the mixture of room and outdoor air flowing through said conduit.

7. An air conditioning unit comprising a casing having openings through which outdoor and recirculated air is admitted, a damper for controlling the proportionate amounts of outdoor and recirculated air admitted to the casing, means within the casing for mixing the outdoor and recirculated air, means for heating the mixed air, a single thermostat for controlling the position of the damper, said thermostat being mounted within the casing so as to respond in part to the mixed air leaving said air-mixing means, and exposed in part directly to said heating means.

8. An air conditioning unit comprising a casing having openings through which outdoor and recirculated air is admitted, a damper for controlling the proportionate amounts of outdoor and recirculated air admitted to the casing, means within the casing for mixing the outdoor and recirculated air, means for heating the mixed air, a thermostat for controlling said damper and heating means, said thermostat being mounted in the region of the air leaving said heating means but having a portion which is heat insulated from the air leaving the heating means, and means for directing mixed air leaving said air-mixing means toward said heat-insulated portion so as to affect a portion of said thermostat whereby the thermostat responds in part to the mixed air leaving the air-mixing means and in part to the air leaving the heating means.

9. An air conditioning unit comprising a casing having openings through which outdoor and recirculated air is admitted, a damper for controlling the proportionate amounts of outdoor and recirculated air admitted to the casing, means within the casing for mixing the outdoor and recirculated air, means for heating the mixed air, a thermostat for controlling said damper and heating means, said thermostat being mounted in the region of the air leaving said heating means but having a portion which is heat insulated from the air leaving the heating means, and means for directing mixed air leaving said air-mixing means toward said heat-insulated portion so as to affect a portion of said thermostat whereby the thermostat responds in part to the mixed air leaving the air-mixing means and in part to the air leaving the heating means, said last-mentioned means including a conduit which passes through said heating means but is insulated therefrom.

10. An air conditioning unit comprising a casing having openings through which outdoor and recirculated air is admitted, a damper for controlling the proportionate amounts of outdoor and recirculated air admitted to the casing, means within the casing for mixing the outdoor and recirculated air, means for heating the mixed air, a thermostat for controlling said damper and heating means, said thermostat being mounted in the region of the air leaving said heating means but having a portion which is heat insulated from the air leaving the heating means, and means for directing mixed air leaving said air-mixing means toward said heat-insulated portion so as to affect a portion of said thermostat whereby the thermostat responds in part to the mixed air leaving the air-mixing means and in part to the air leaving the heating means, said last-mentioned means including a conduit which passes around said heating means.

11. In an air conditioning unit comprising a source of heat and a damper which admits predetermined quantities of outdoor and recirculated air to said unit, a single thermostat for controlling the position of said damper, one part of which is exposed directly to said heated air and another part of which is exposed directly to the unheated air whereby the control point of the thermostat is raised as the outside temperature falls, and the lower the temperature of the unheated air the higher the temperature of the heated air.

12. An air conditioning unit comprising a source of heat, a valve for controlling the supply of heat, a damper arranged to admit outdoor and recirculated air, a single thermostat for controlling said valve and said damper, said thermostat being exposed in part directly to heated mixed air and in part directly to unheated mixed air, whereby said thermostat operates to control the heat source to obtain a greater heating effect as the temperature of the unheated mixed air decreases.

JOHN McELGIN.